United States Patent [19]
Fukushima

[11] Patent Number: 5,868,228
[45] Date of Patent: Feb. 9, 1999

[54] LOCKUP CLUTCH FOR A TORQUE CONVERTER HAVING A SPRING RETAINER

[75] Inventor: Hirotaka Fukushima, Hirakata, Japan

[73] Assignee: Exedy Corporation, Neyagawa, Japan

[21] Appl. No.: 815,171

[22] Filed: Mar. 11, 1997

[30] Foreign Application Priority Data

Mar. 19, 1996 [JP] Japan .................................. 8-062589

[51] Int. Cl.[6] ............................................... F16H 45/02
[52] U.S. Cl. ........................................ 192/3.29; 192/205
[58] Field of Search ............................... 192/3.29, 3.28, 192/203, 205, 212

[56] References Cited

U.S. PATENT DOCUMENTS

| | | | |
|---|---|---|---|
| 4,138,003 | 2/1979 | Malloy | 192/3.29 |
| 4,279,132 | 7/1981 | Lamarche . | |
| 4,890,706 | 1/1990 | Miura et al. | 192/3.28 |
| 4,976,656 | 12/1990 | Bacher et al. | 192/3.28 X |
| 4,987,980 | 1/1991 | Fujimoto | 192/3.28 |
| 5,209,330 | 5/1993 | Macdonald | 192/3.29 |
| 5,230,709 | 7/1993 | Tanaka et al. . | |
| 5,590,750 | 1/1997 | Graton et al. | 192/3.29 |

FOREIGN PATENT DOCUMENTS 29 41 662   4/1980   Germany .

*Primary Examiner*—Rodney H. Bonck
*Attorney, Agent, or Firm*—Hinjyu An Intellectual Property Firm

[57] ABSTRACT

A lockup clutch (8) includes a lockup clutch unit and an elastic coupling unit. The clutch unit is operable to transmit and interrupt a torque between a front cover of a torque convertor and a turbine therein. The elastic coupling unit includes a plurality of arc-shaped springs (13) extending circumferentially, and a coupling member (30) radially coupling the arc-shaped springs together.

11 Claims, 7 Drawing Sheets

5,868,228

LOCKUP CLUTCH FOR A TORQUE CONVERTER HAVING A SPRING RETAINER

BACKGROUND OF THE INVENTION

A. Field of the Invention

The present invention relates to a lockup clutch of a torque converter, and in particular to a lockup clutch having circumferentially extending coil springs and spring coupling members.

B. Description of the Background Art

A torque converter is a device for transmitting torque from an engine to a transmission via working fluid or oil. A torque converter usually includes an impeller coupled to an input front cover, a turbine opposed to the impeller, and a stator disposed between inner peripheral portions of the impeller and turbine. Working oil flowing from the impeller rotates the turbine, and then is directed by the stator toward the impeller.

Some of the torque converters employ lockup clutches for mechanically transmitting a torque from the input front cover to the turbine or turbine hub. The lockup clutch includes, for example, a piston member which can be coupled to a friction surface of the front cover, a retaining member fixed to the piston member, a plurality of coil springs each carried at its opposite ends by the retaining member, and a circular driven member extending from the turbine hub and engaged with the opposite ends of the coil springs. The coil springs may be replaced with elongated arc-shaped circumferentially extending springs. The arc-shaped springs provide characteristics such as low rigidity and allow for a large maximum torsional displacement angle when the lock-up clutch is engaged, and thus can effectively absorb fine torsional vibrations.

In the conventional lockup clutch, the arc-shaped springs are compressed when a shock or a torsional vibration occurs during a lockup operation, i.e., engagement of the lockup clutch. In this state, the arc-shaped springs are moved radially outward by a centrifugal force, and further the middle portions of them are shifted radially outward relatively to their ends. As a result, the arc-shaped springs slide on an outer peripheral support member. Thereby, a friction occurs between the arc-shaped spring and the outer peripheral support member, so that fine torsional vibrations cannot be sufficiently absorbed due to this friction. Thus, some of the torsional vibrations are transmitted to transmission without being dampened.

SUMMARY OF THE INVENTION

One object of the invention is to provide a lockup clutch having a circumferentially extending elongated elastic member with reduced frictional sliding between the elastic member and other members.

In accordance with one aspect of the present invention, a lockup clutch of a torque converter has a front cover, an impeller and a turbine. There is also a lockup clutch for selective engagement and disengagement of the lockup clutch with the front cover of the torque converter. As well, an elastic coupling unit is disposed between the lockup clutch and the turbine, the elastic coupling unit having a plurality of elongated coil-like elastic members extending in a circumferential direction within the torque convertor which elastically couple the lockup clutch with the turbine, and a coupling member for circumferentially coupling adjacent ends of the coil-like elastic members, the elastic coupling unit being arranged in series with respect to the lockup clutch.

In accordance with another aspect of the present invention, a lockup clutch of a torque converter has a front cover, an impeller and a turbine. A piston member is configured for selective engagement and disengagement with the front cover of the torque converter. A plurality of coil-shaped elastic members are supported by the piston member, the coil-shaped elastic members extending in a circumferential direction. An output member is engaged with the elastic members, the output member being configured for connection with the turbine of the torque converter. As well, a coupling member circumferentially couples adjacent circumferential ends of the elastic members together.

Preferably, the coupling member is formed of an annular portion, and a plurality of engaging portions are engaged to the annular portion for rotation therewith and the engaging portions are engaged with the adjacent circumferential ends of the elastic members.

Preferably, the plurality of elastic members are formed of first, second, third and fourth elastic members, and the plurality of engaging portions are formed of a first engaging portion disposed between the first and second elastic members, and a second engaging portion disposed between the third and fourth elastic members.

Preferably, the engaging portions are formed of spring seats engaged with ends of the plurality of elastic members.

Preferably, the engaging portions are formed with circumferentially extending pins which extend from the spring seats into the elastic members.

Preferably, the annular portion is formed with at least one radially projecting portion formed with at least one aperture, and each of the engaging portions comprise a first and a second engaging portion. the first engaging portion formed with on pin extending through the aperture and the second engaging portion formed with a second aperture, the pin also extending into the second aperture to secure the first and second engaging portions on the annular portion.

In accordance with another aspect of the present invention, a lockup clutch of a torque converter has a front cover, an impeller and a turbine and a piston member is configured for selective engagement and disengagement with the front cover of the torque converter. A plurality of coil-shaped elastic members are supported by the piston member, the coil-shaped elastic members extending in a circumferential direction. An output member is engaged with the elastic members, the output member configured for connection with the turbine of the torque converter. An annular ring disposed between the turbine and the piston member, the annular ring formed with a plurality of engaging portions which couple adjacent circumferential ends of the elastic members together, the annular ring disposed radially inwardly from and adjacent to the elastic members.

Preferably, the plurality of elastic members are formed of first, second, third and fourth elastic members, and the plurality of engaging portions are formed of a first engaging portion disposed between the first and second elastic members, and a second engaging portion disposed between the third and fourth elastic members.

Preferably, the engaging portions are formed of spring seats engaged with the circumferential ends of the plurality of elastic members.

Preferably, the engaging portions are formed with circumferentially extending pins which extend from the spring seats into the elastic members.

Preferably, the annular ring is formed with at least one radially projecting portion formed with at least one aperture, and each of the engaging portions comprise a first and a second engaging portion. the first engaging portion formed with on pin extending through the aperture and the second engaging portion formed with a second aperture, the pin also extending into the second aperture to secure the first and second engaging portions on the annular portion.

When the lockup clutch is engaged, torque is transmitted between the front cover via the elastic coupling unit. When torsional vibrations are transmitted to the lockup clutch, relative rotation periodically occurs between the front cover and turbine, so that the elastic members are circumferentially compressed. Since the elastic members are coupled together by the coupling member, they are suppressed from moving radially outward. Therefore, frictional sliding hardly occurs between the elastic members and other members at the radially outer positions.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
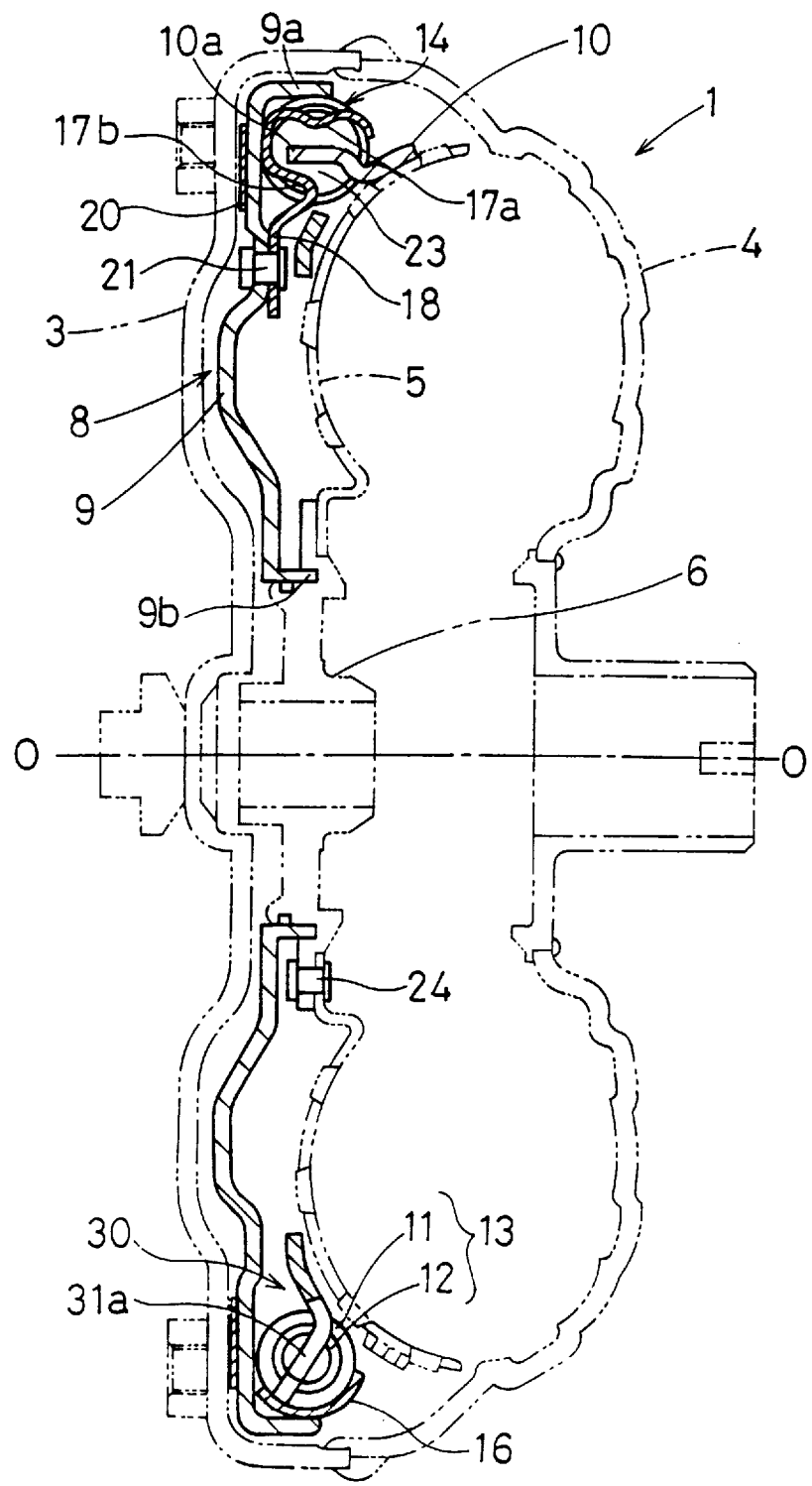
FIG. 1 is a schematic cross sectional side view of a torque converter in accordance with one embodiment of the present invention, showing some of the components of the torque converter in phantom.

A torque converter 1 shown in FIG. 1 includes a torque converter main unit, which is formed of a front cover 3, an impeller 4, a turbine 5 and a stator (not shown), and a lockup clutch 8.

The front cover 3, and an outer shell of the impeller 4 form a working oil chamber filled with working oil, i.e., hydraulic fluid. The impeller 4, turbine 5 and stator (not shown) have structures and functions well known in the art and therefore, descriptions will not be provided. The turbine 5 is fixed at its inner peripheral portion to a turbine hub 6 by rivets 24. The turbine hub 6 is configured to engage a spline shaft (not shown) extending from a transmission (not shown).

The lockup clutch 8 is a device for mechanically transmitting a torque from the front cover 3 to the turbine 5 and the turbine hub 6. The lockup clutch 8 includes a piston member 9, a driven member 10, four arc-shaped springs 13, each of which is formed of a large coil spring 11 and a small coil spring 12, a retaining plate 14 and a coupling member 30.

The piston member 9 is operated to selectively move into engagement and dis-engagement with the front cover 3 by control of the hydraulic pressure in portions of the torque converter in a manner generally known in the art. The piston member 9 is circular or annular, and has cylindrical portions 9a and 9b at their outer and inner peripheries, respectively. The outer and inner cylindrical portions 9a and 9b extend toward the transmission (i.e., rightward in FIG. 1). The inner cylindrical portion 9b is supported on an outer peripheral surface of the turbine hub 6 but may rotate and move axially with respect to the turbine hub 6. With the lockup clutch in a clutch released or disengaged state, as shown in FIG. 1, the inner cylindrical portion 9b is in contact with the turbine hub 6, and may undergo axial movement in a direction toward the front cover 3 in response to changes in hydraulic pressure. The piston member 9 is provided on a radially extending surface thereof with a friction facing 20 which is fixed thereto and is opposed to a friction surface of the front cover 3.

The retaining plate 14 is provided for holding the four arc-shaped springs 13 on the piston member 9. The retaining plate 14 is disposed radially inside the outer cylindrical portion 9a of the piston member 9. The retaining plate 14 is basically formed of an outer peripheral support portion 16 having a substantially arc-shaped section. The outer peripheral support portion 16 is in contact with an inner peripheral surface of the outer cylindrical portion 9a. At diametrically opposite positions, at which the outer peripheral support portion 16 is circumferentially equally divided into two, the outer peripheral support portion 16 is provided with circumferential support portions 17a and 17b which project and bend radially inward and toward the transmission. Fixing portions 18 extend radially inward from the circumferential support portions 17a and 17b. Each fixing portion 18 circumferentially extends through a predetermined angle, and is fixed to the piston member 9 by three rivets 21.

Many of the features of the piston member 9, the driven member 10 and the retaining plate 14 are similar to those disclosed and described in co-pending U.S. patent application Ser. No. 08/656,820, filed Jun. 3, 1996. U.S. patent application Ser. No. 08/656,820 is incorporated herein by reference. U.S. patent application Ser. No. 08/656,820 is commonly assigned to the assignee of the present application.

The driven member 10 is formed of an annular plate welded to the outer peripheral portion of the shell of the turbine 5. Two support portions 10a project from the driven member 10 toward the front cover 3. The two support portions 10a generally extend between in an axial direction between the circumferential support portions 17a and 17b of the retaining plate 14, respectively.

Figure 2:
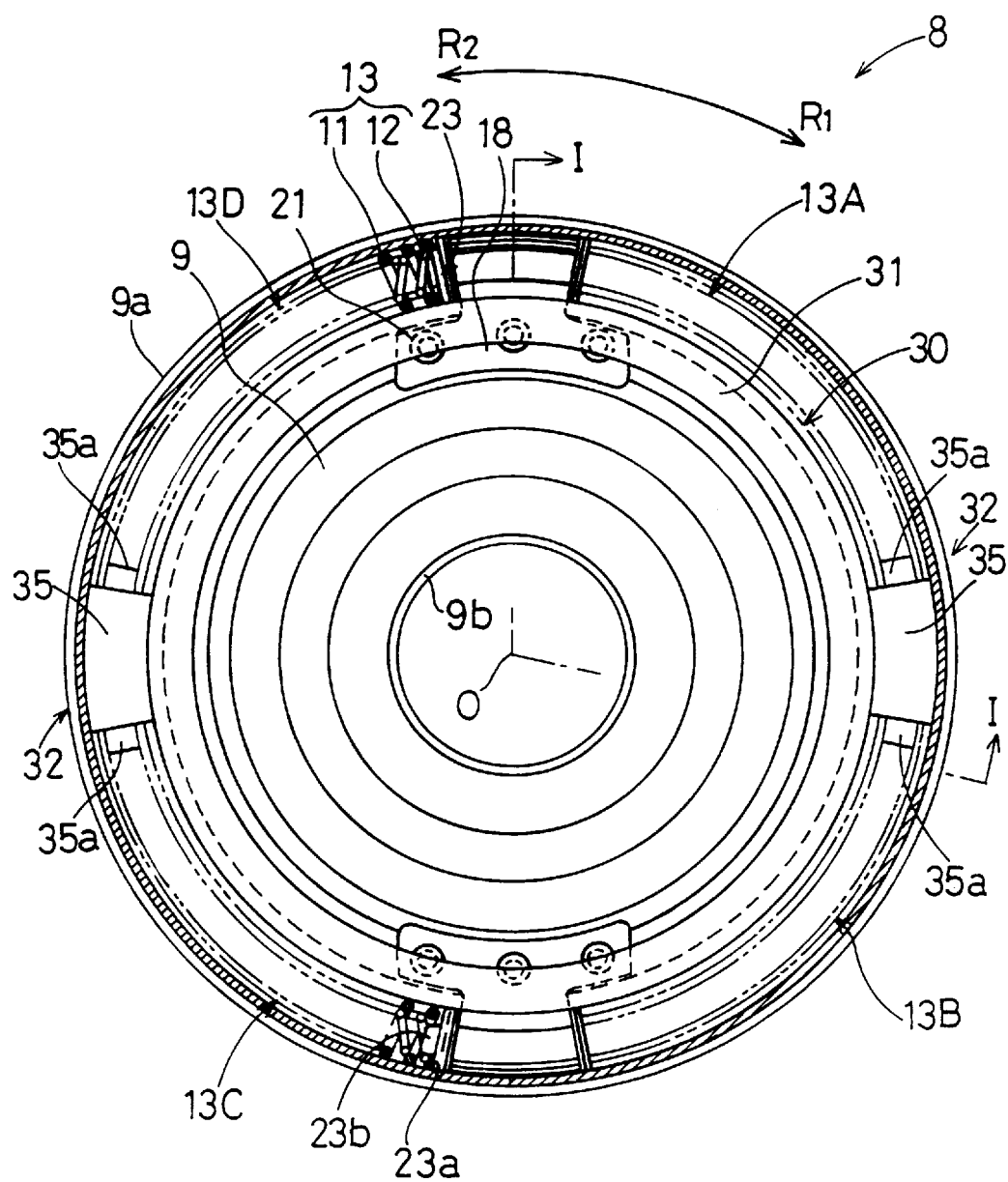
FIG. 2 is a fragmentary cross sectional end view of the torque converter depicted in FIG. 1, showing portions of a lockup clutch of the present invention having spring members and a coupling member engaging the spring members.
Figure 3:
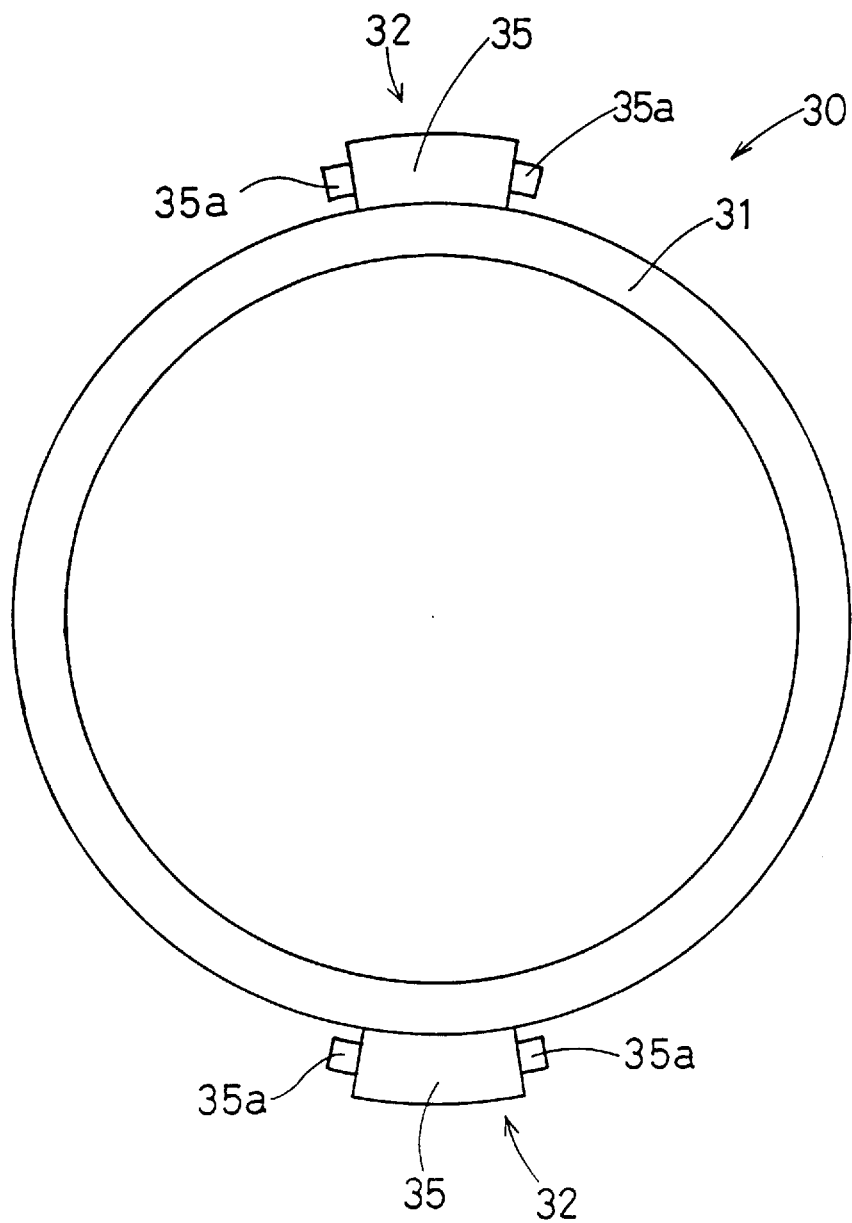
FIG. 3 is an elevational view of the coupling member shown removed from the torque converter and the lockup clutch depicted in FIGS. 1 and 2.
Figure 4:
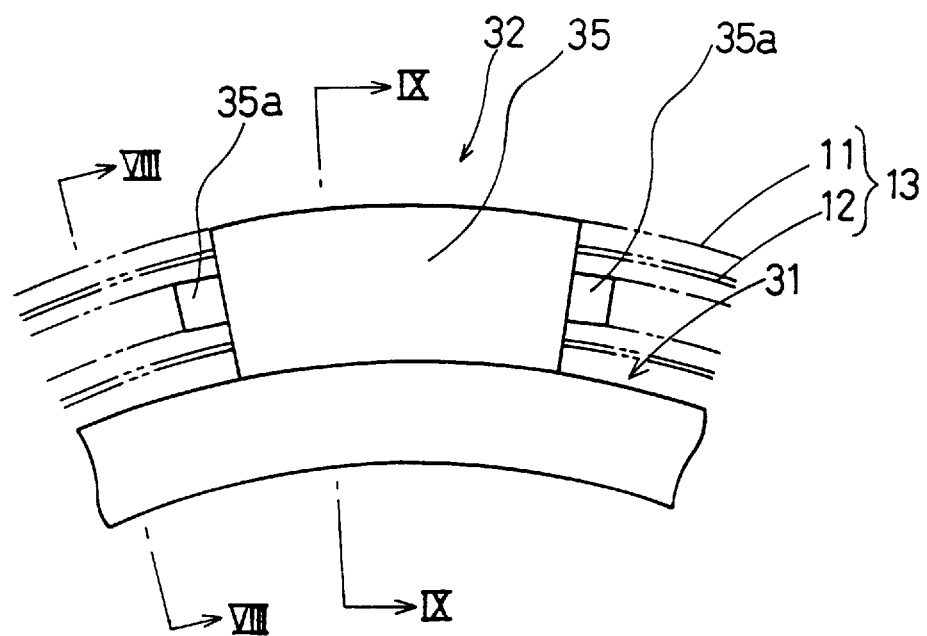
FIG. 4 is a fragmentary, elevational schematic view of a portion of the lockup clutch depicted in FIGS. 1, and 2, on an enlarged scale, showing a portion the coupling member depicted in FIG. 3 in engagement with the spring members and showing a portions of an annular plate and a seat member.

The arc-shaped springs 13 are provided for transmitting a torque in the lockup clutch 8 and absorbing shocks due to clutch engagement and torsional vibrations due to fluctuations of rotation of the engine. The arc-shaped springs 13 elastically couple in the rotation direction the piston member 9 to the turbine 5 via the retaining plate 14 and the driven plate 10. Each arc-shaped spring 13 has a coil-like form, and circumferentially extends through about 70 degrees. Each arc-shaped spring 13 is formed of a large spring 11 and a small spring 12 disposed in the large spring 11. As shown in FIG. 2, the first and second arc-shaped springs 13A and 13B are disposed at one of two arc-shaped regions defined between two sets of support portions, i.e., the circumferential support portions 17a and 17b and the support portions 10a. Third and fourth arc-shaped springs 13C and 13D are disposed at the other arc-shaped region. The third and fourth arc-shaped springs 13C and 13D are similar to the first and second arc-shaped springs 13A and 13B, and thus description of one pair of springs is applicable to the other pair, therefore description of only one pair of springs 13A and 13B is provided.

In FIG. 2, two rotational directions are shown, R1 and R2 which indicate the directions of rotation of the front cover 3 with respect to the turbine 5 in response to vibration when the lockup clutch 8 is engaged or in a lockup state engaged with the front cover 3. As shown in FIG. 2, a spring seat 23 is disposed between an end in a direction R2, of the first arc-shaped spring 13A and the support portions 17a, 17b and 10a. The spring seat 23 is also disposed between a forward end, in a direction R1, of the second arc-shaped spring 13B and the support portions 17a, 17b and 10a. The spring seat 23 has a circular plate portion 23a receiving the large and small coil springs 11 and 12 of the arc-shaped spring, and a projection 23b extending from the circular plate portion 23a into the small spring 12.

The first and second arc-shaped springs 13A and 13B are coupled together in series, and a spring seat portion 32 of the coupling member 30, which is described below, is interposed between these springs 13A and 13B. Thus, the first and second arc-shaped springs 13A and 13B cooperate such that with the lockup clutch 8 in an engaged state, the front cover 3 and the turbine 5 may under limited relative angular displacement within a relatively large torsion angle and exhibit low rigidity.

The coupling member 30 circumferentially couples arc-shaped springs 13 together and restricts radially movement of the arc-shaped springs 13. The coupling member 30 is formed of an annular plate 31 and the spring seat portion 32 formed at spaced apart positions on annular plate 31.

Portions of the annular plate 31 are shown in greater detail in FIGS. 3, 4, 5, 6 and 7. The annular plate 31 is arranged radially inside the arc-shaped springs 13, and is free to rotate between the retaining plate 14 and the turbine 5. The annular plate 31 is provided at diametrically opposed two positions with projected portions 31a which extend radially outward. One of the projected portions 31a is disposed between the first and second arc-shaped springs 13A and 13B, and the other is disposed between the third and fourth arc-shaped springs 13C and 13D. Each projected portion 31a is provided with circumferentially spaced two apertures 31b.

Figure 5:
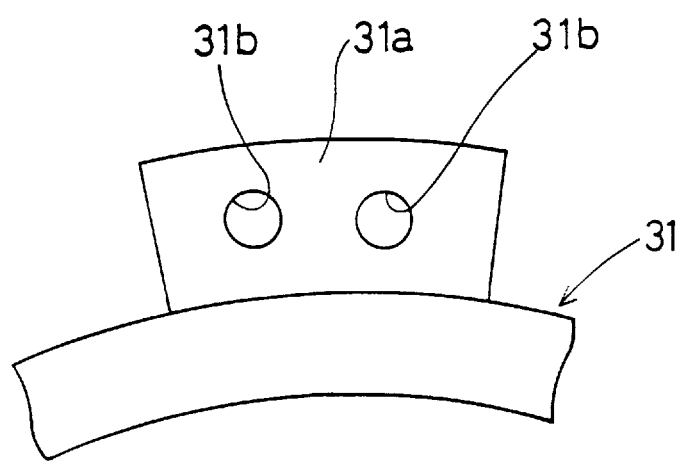
FIG. 5 is a fragmentary elevational view of the annular plate depicted in FIG. 4.
Figure 6:
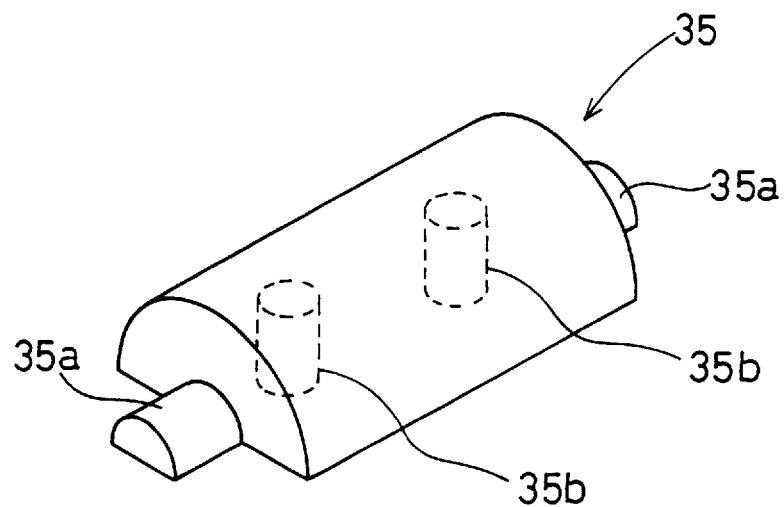
FIG. 6 is a perspective view of a first seat member of the seat member depicted in FIG. 4.
Figure 7:
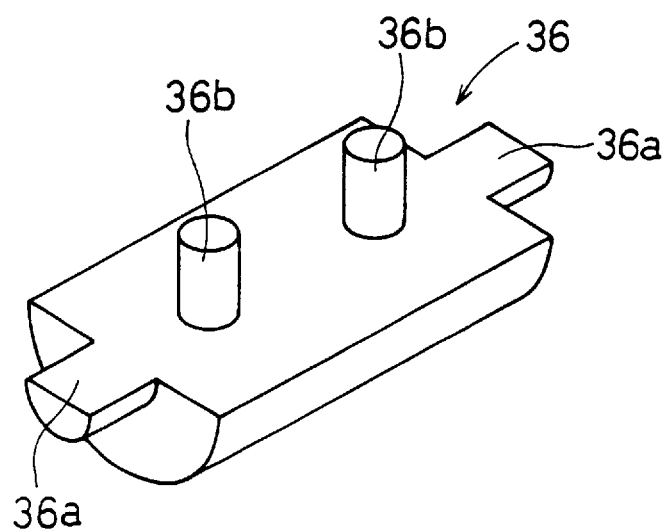
FIG. 7 is a perspective view of a second seat member of the seat member depicted in FIG. 4.
Figure 8:
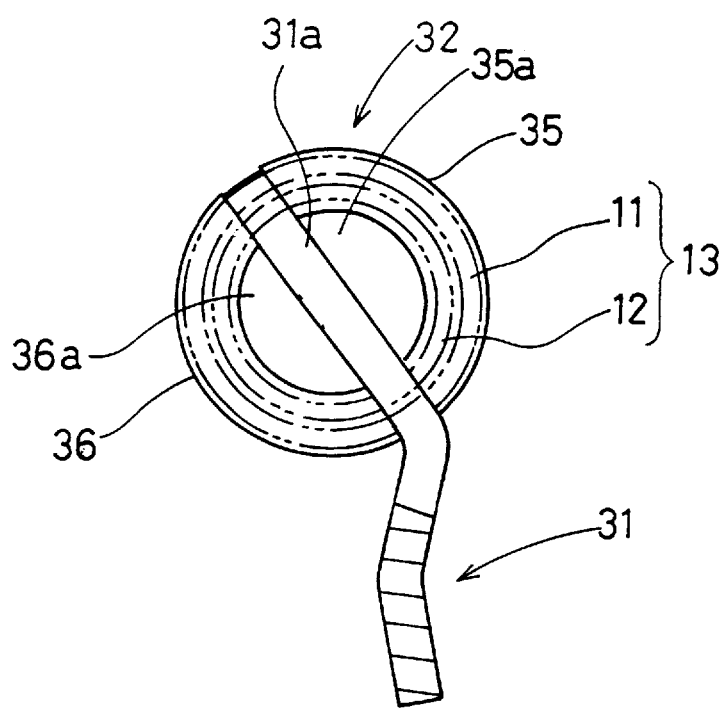
FIG. 8 is a cross section of a portion of the lockup clutch taken along line VIII—VIII in FIG. 4.
Figure 9:
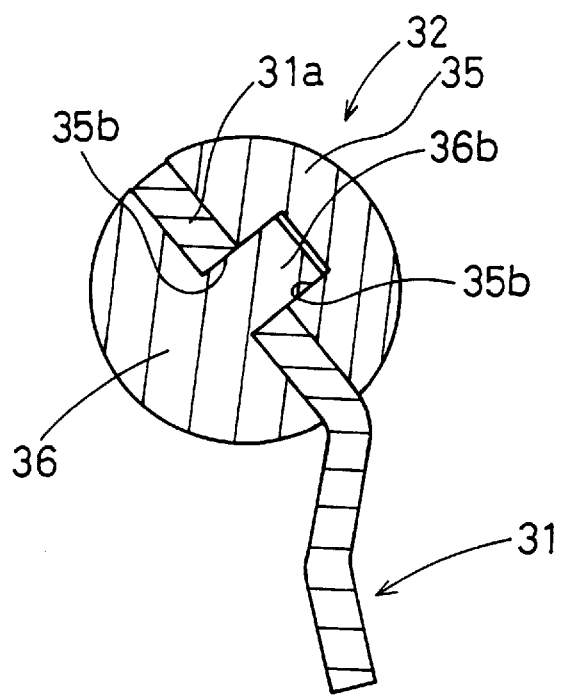
FIG. 9 is a cross section of a portion of the lockup clutch and the seat member taken along line IX—IX in FIG. 4.

The spring seat portion 32 is disposed on the projected portion 31a for coupling the first and second arc-shaped springs 13A and 13B in series and restricting radially outward movement of the ends of these springs 13A and 13B. Each spring seat portion 32 is formed of a pair of seat members, i.e., first and second seat members 35 and 36 coupled to the projected portion 31a, as shown in FIGS. 6 and 7. The first and second seat members 35 and 36 have forms which can be prepared by longitudinally dividing a columnar member into two, and thus have semicircular sections, as shown in FIGS. 5 and 6. Each of the first and second seat members 35 and 36 are provided at its opposite ends with restricting projections or portions 35a or 36a each having a semicircular section. The first seat member 35 is provided at its longitudinal flat surface with two apertures 35b, and the second seat member 36 is provided at its longitudinal flat surface with two projections 36b. As shown in FIG. 8, the flat surfaces of the first and second seat members 35 and 36 are in contact and engaged with opposite surfaces of the projected portion 31a, respectively. The projection 36b of the second seat member 36 extends through the aperture 31b formed at the projected portion 31a, and is inserted into the aperture 35b in the second seat member 35, as shown in FIG. 9.

Accordingly, with respect to the spring seat portion 32 described above, ends of the first and second arc-shaped springs 13A and 13B are in contact with the corresponding semicircular end surfaces of the first and second seat members 35 and 36. Restricting portions 35a and 36a extend into the small coil springs 12 of the arc-shaped springs 13.

In this manner, the ends of the first and second arc-shaped springs 13A and 13B are radially coupled by the coupling member 30 to the ends of the third and fourth arc-shaped springs 13C and 13D. Thus, radially outward movement of these ends are restricted. The restricting structure is similar to a structure in which two circumferentially longer arc-shaped springs are radially coupled at their circumferentially middle portions by the coupling member 30.

An operation will be described below.

In the released state of the lockup clutch 8 shown in FIG. 1, working oil fills a space between the front cover 3 and the piston member 9. When the working oil is drained from this space or hydraulic pressure therein is reduced, the piston member 9 moves toward the front cover 3, so that the friction facing 20 is brought into close contact with the friction surface of the front cover 3. Thereby, a torque of the front cover 3 is transmitted to the piston member 9, and is further transmitted to the turbine 5 via the retaining plate 14, arc-shaped springs 13 and driven member 10. The torque is then transmitted from the turbine hub 6 to the unillustrated shaft extending from the transmission.

When torsional vibrations are transmitted to the front cover 3 during engagement of the lockup clutch, relative rotation periodically occurs between the piston member 9 and the driven member 10, so that the arc-shaped springs 13 are circumferentially compressed. In this operation, fine torsional vibrations are effectively absorbed owing to the characteristics of the arc-shaped springs 13 exhibiting a low rigidity and a large torsion angle. Although the arc-shaped springs 13 tend to shift or bend radially outward when compressed, and further the centrifugal force tends to move them radially outward. However, radially outward movement of the arc-shaped springs 13 is suppressed because the ends of them are carried by the spring seats 23 and spring seat portions 32. Consequently, frictional sliding hardly occurs between the arc-shaped springs 13 and the outer support portion 16. Thus, the arc-shaped springs 13 can effectively absorb fine torsional vibrations.

Structures other than that in the foregoing embodiment may be employed for restricting radially outward movement of the arc-shaped springs 13 by the coupling member 30. The number and the manner of arrangement of the arc-shaped springs 13 are not restricted to those in the foregoing embodiment.

According to the lockup clutch of the torque converter of the invention, the plurality of elastic members are radially coupled together by the coupling member, so that radially outward movement of the elastic members is restricted. Therefore, frictional sliding hardly occurs between the elastic members and members arranged radially outside the elastic members.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A lockup clutch of a torque converter having a front cover, an impeller and a turbine, comprising:

a piston member configured for selective engagement and disengagement with the front cover of the torque converter;

a plurality of coil-shaped elastic members supported by said piston member, said coil-shaped elastic members extending a circumferential direction;

an output member engaged with said elastic members, said output member configured for connection with the turbine of the torque converter; and a coupling member circumferentially coupling adjacent circumferential ends of said elastic members together;

wherein said coupling member is formed of:
     an annular portion, and
     a plurality of engaging portions fixed to said annular portion for rotation therewith and said engaging portions are engaged with said adjacent circumferential ends of said elastic members, a portion of said engaging portions extending into a central portion of said elastic members.

2. The lockup clutch of the torque converter as set forth in claim 1, wherein:

said plurality of elastic members are formed of first, second, third and fourth elastic members, and said plurality of engaging portions are formed of a first engaging portion disposed between said first and second elastic members, and a second engaging portion disposed between said third and fourth elastic members.

3. The lockup clutch of the torque converter as set forth in claim 2, wherein said engaging portions are formed of spring seats engaged with ends of said plurality of elastic members.

4. The lockup clutch of the torque converter according to claim 3, wherein said engaging portions are formed with circumferentially extending pins which extend from said spring seats into said elastic members.

5. The lockup clutch of the torque converter according to claim 1, wherein said annular portion is formed with at least one radially projecting portion formed with at least one aperture; and each of said engaging portions comprise a first and a second engaging portion, said first engaging portion formed with one pin extending through said aperture and said second engaging portion formed with a second aperture, said pin also extending into said second aperture to secure said first and second engaging portions on said annular portion.

6. A lockup clutch of a torque converter having a front cover, an impeller and a turbine, comprising:

a piston member configured for selective engagement and disengagement with the front cover of the torque converter;

a plurality of coil-shaped elastic members supported by said piston member, said coil-shaped elastic members extending in a circumferential direction;

an output member engaged with said elastic members, said output member configured for connection with the turbine of the torque converter;

an annular ring disposed between the turbine and said piston member, a plurality of engaging portions fixed to said annular ring which couple adjacent circumferential ends of said elastic members together, a portion of said engaging portions extending at least partially into central portions of said elastic members, said annular ring disposed radially inwardly from and adjacent to said elastic members.

7. The lockup clutch of the torque converter as set forth in claim 6, wherein:

said plurality of elastic members are formed of first, second, third and fourth elastic members, and said plurality of engaging portions are formed of a first engaging portion disposed between said first and second elastic members, and a second engaging portion disposed between said third and fourth elastic members.

8. The lockup clutch of the torque converter as set forth in claim 6, wherein said engaging portions are formed of spring seats engaged with said circumferential ends of said plurality of elastic members.

9. The lockup clutch of the torque converter according to claim 8, wherein said engaging portions are formed with circumferentially extending pins which extend from said spring seats into said elastic members.

10. The lockup clutch of the torque converter according to claim 6, wherein said annular ring is formed with at least one radially projecting portion formed with at least one aperture; and each of said engaging portions comprise a first and a second engaging portion. said first engaging portion formed with on pin extending through said aperture and said second engaging portion formed with a second aperture, said pin also extending into said second aperture to secure said first and second engaging portions on said annular portion.

11. A lockup clutch of a torque converter having a front cover, an impeller and a turbine, comprising:

a piston member configured for selective engagement and disengagement with the front cover of the torque converter;

a plurality of coil-shaped elastic members supported at radially outward positions within said piston member, said coil-shaped elastic members extending in a circumferential direction;

an output member engaged with said elastic members, said output member configured for connection with the turbine of the torque converter; and a coupling member circumferentially coupling adjacent circumferential ends of said elastic members together, said coupling member is formed with an annular portion disposed at a radially inward side of said elastic members, and a plurality of engaging portions fixed to a radially outer side of said annular portion for rotation therewith and said engaging portions being engaged with said adjacent circumferential ends of said elastic members, a portion of said engaging portions extending into a central portion of said elastic members.

* * * * *